United States Patent
Teske et al.

[15] 3,700,248
[45] Oct. 24, 1972

[54] SLIDE RING FOR RADIAL AND AXIAL SEALING

[72] Inventors: Fritz Teske, Industriestr. 28; Lothar Teske, Industriestr. 30, both of 505 Porz-Westhoven; Robert Dreismann, Niehler-Kirchweg 139, 5 Cologne-Weidenpesch, all of Germany

[22] Filed: Nov. 10, 1969

[21] Appl. No.: 875,148

[30] Foreign Application Priority Data

Nov. 9, 1968 Germany..........P 18 08 060.9
Nov. 9, 1968 Germany..........P 18 08 063.2

[52] U.S. Cl. ................277/80, 308/187.1, 308/36.1
[51] Int. Cl. ...........................................F16c 33/78
[58] Field of Search .....64/30 R; 192/84 PM; 251/65; 277/80; 308/36.1, 187.1, 187.2

[56] References Cited

UNITED STATES PATENTS

| | | |
|---|---|---|
| 3,432,174 | 3/1969 | Teske et al. ..................277/80 |
| 3,495,620 | 2/1970 | Raimondi et al..........251/65 X |
| 2,959,832 | 11/1960 | Baermann................277/80 X |
| 3,128,104 | 4/1964 | Teske ......................277/80 X |

FOREIGN PATENTS OR APPLICATIONS

| | | |
|---|---|---|
| 874,517 | 8/1961 | Great Britain...............277/80 |
| 1,553,038 | 12/1968 | France........................277/80 |

*Primary Examiner*—Edward J. Earls
*Attorney*—Spencer & Kaye

[57] ABSTRACT

A slide ring seal for radial and axial sealing between a stationary and a rotating machine part, particularly in roller bearings, journal bearings and the like. Independent, strong and thick rings are tightly fastened to each machine part in a common radial plane with respect to one another, while an axial annular gap is maintained between them. The gap is covered by at least one annular plate which is held to the tight-fitting rings by magnetic force.

20 Claims, 9 Drawing Figures

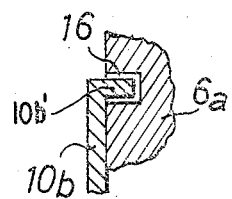
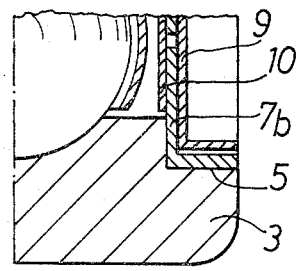
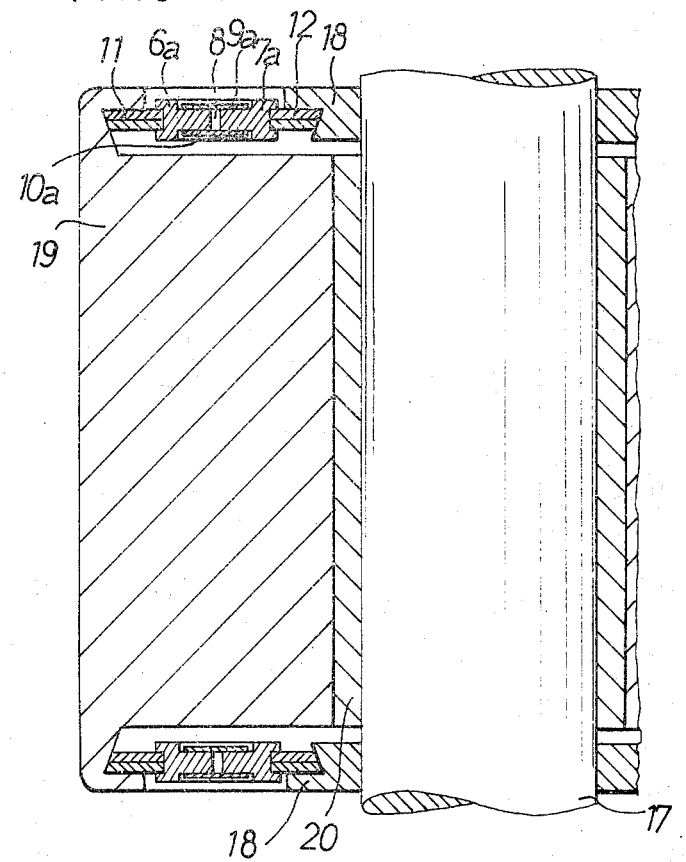

SLIDE RING FOR RADIAL AND AXIAL SEALING

BACKGROUND OF THE INVENTION

Slide ring seals which seal by means of magnetic force are known in the art. According to one form of construction, such seals are provided with an intermediate layer of non-magnetic material which reduces the friction between the opposing magnetic rings and which prevents the magnetic rings from sliding directly on one another. However, the attraction of the magnets can not be fully utilized in this arrangement.

In another previously known embodiment of a slide ring seal, the sliding portion and the adhering portions are formed as independent magnetic elements and are connected by means of a membrane of elastic material. In such a slide ring seal, the magnetic element, however, is in direct contact with the machine part. The anchoring of the magnetic elements to the elastic connecting part requires a special manufacturing process, and such slide ring seals can not be kept structurally small enough for many applications. The contact of the magnetic ring with the machine part requires a special preparation of the machine part surface so that the annular magnetic plate closely adheres to the machine part. Moreover, the machine parts are generally spaced at a relatively wide distance from one another in the radial direction, as is the case with ball bearings, roller bearings and the like. This spacing must be bridged by the magnetic ring, and the sealing contact of the magnetic ring can be adversely affected by the pressure differential between the inside and outside of the magnetic ring and by movement of the machine parts due to the play which they may undergo.

SUMMARY OF THE INVENTION

It is an object of the present invention to provide a slide ring seal for radial and axial sealing between a stationary machine part and a rotating machine part, in which independent, strong and thick rings are disposed in a common radial plane with respect to one another while maintaining an axial annular gap, and wherein the gap is covered by at least one annular disc which is attracted to the inner and/or outer surface of the tight-fitting rings by magnetic force. It is a further object of the present invention to increase the sealing effect as compared to the known embodiments, while providing for simple and compact construction.

The slide ring seal according to the present invention is distinguished from the previous slide ring seals in that the thick rings, which are fastened to the movable machine parts in a common plane to provide a preferably narrow annular gap, are in the form of magnets, and the magnetizable or magnetized annular plates covering the gap are very thin with respect to the thickness of the magnetic rings. Because of this thinness, they have inherent elasticity which makes them flexible.

With such a configuration as set out above, there is obtained a slide ring seal which is capable of providing a very efficient sealing action. A durable, gastight seal is obtained. Further, the construction of the slide ring seal is extremely simple. The individual elements of the slide ring seal of the present invention consist of components of the simplest structure. Moreover, the element actually bridging the gap between the two parts is very thin and flexible, and does not present any appreciable bulk. These thin plates adhere strongly to the magnets. The adhering force may be further augmented by making the plates themselves magnetic.

The slide ring seal according to the present invention is particularly suited for sealing roller bearings, ball bearings, friction bearings, and the like, where it is important that the interior of the device be gas-tight in order to prevent the grease in the interior of the device from turning into a resin.

A dependable seal is also assured when the seal according to the invention is subjected to varying air pressures and weather conditions.

The annular covering or sealing plate may extend over the entire free surface of the radially extending magnetic rings. It is also possible to dispose the annular plate in annular recesses provided in each of the two magnetic rings, so that it lies below the surface of the rings. The annular plate can also be provided with either a continuous or segmented collar which engages annular grooves in the two magnetic rings. In this way, the covering plates can be approximately centered with respect to the rings.

The magnetic rings themselves, which may be resilient as well as rigid, are advisably inserted into annular recesses in the machine components, which recesses may be undercut. In this case, the magnetic rings are appropriately adapted to the contour of the recesses. Advantageously, the magnetic rings are disposed in these recesses by a snug or pressed fit in order to achieve an absolutely tight connection of the magnetic rings with the machine components, or, when using prefabricated seals, with the corresponding components of these sealing rings.

The magnetic rings, together with the narrow annular gap, also accomplish an alignment of the machine components with respect to one another.

When the machine components are spaced far from one another, it is advisable to provide intermediate rings between the magnetic rings and the machine components so that the diameter of the magnetic rings can be kept small. When connecting the magnetic rings with the intermediate rings and the intermediate rings with the machine components, it is advisable to make sure that an absolute tight seal is achieved.

This results in a hermetic seal, which makes it possible to maintain, e.g., a nitrogen fill in the sealed area.

It is a further object of the present invention to provide a slide ring seal with a magnetic or magnetized slide ring plate to seal the annular gap between two magnetic rings, in which the annular magnetic plate remains concentrically fixed without special structural holding means even when one machine component rotates at high speed with respect to the other.

According to another feature of the present invention, when the magnetization is in the direction of the axis of rotation of the rotating part, the magnetic abutment surface of the slide ring plate, and/or of the magnetic rings undergoes at least one polarity reversal in the radial direction. Such a pole direction reversal in the radial direction when the magnetic ring plate is axially magnetized acts on only one of the rings and makes it possible to eliminate radial drifting of the slide ring plate even when very high centrifugal forces act on the slide ring plate.

In a further development of the present invention, the opposing parts of the slide ring seal are magnetically aligned with respect to each other, resulting in direct contact between magnet and magnet. This brings about a full utilization of the magnetic force. Intermediate members which might weaken the attraction are avoided. Thus a magnetic slide ring seal is provided which is highly effective and durable, and which at the same time involves a minimum of structure and assures an independently acting, radial-centering action.

Advantageously, the oppositely directed magnetic poles are disposed in concentric circles on the contact surface of the annular slide plate, and at least one pole change must be effective on only one of the components rotating relative to each other. It is also possible to provide a circular arrangement of oppositely directed magnetic poles, which arrangement is interrupted at certain points on the contact surface of the slide ring.

Thus, gas-tightness of the bearings is assured even in case of axial displacement of the bearings, so that the lifetime of the bearings is substantially increased since the initially provided lubricants no longer turn to resin due to being exposed to oxygen in the air. It should be mentioned that the arrangement can also be used effectively as an end seal, to produce a homogeneous seal, for example, when there is not enough room for a seal in medium size or smaller ball bearings.

BRIEF DESCRIPTION OF THE DRAWINGS

FIG. 3a is a cross-sectional detail view of a portion of the arrangement of FIG. 3.

FIG. 4a is a cross-sectional view of a portion of a variation of the embodiment of FIG. 4.

FIG. 5 is an axial cross-sectional view of a slide ring seal according to the present invention in a journal bearing.

DESCRIPTION OF THE PREFERRED EMBODIMENTS

Figure 1:
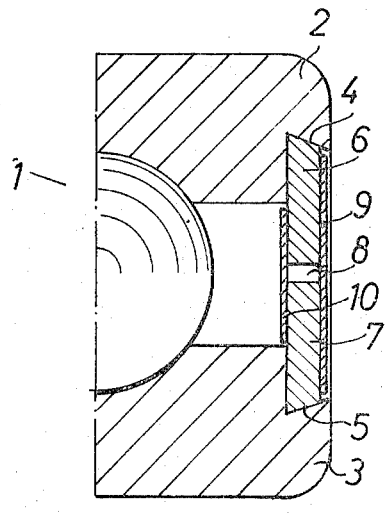
FIG. 1 is a cross-sectional view of a portion of a ball bearing using a slide ring seal according to the present invention.

The ball bearing 1 of FIG. 1 is provided with an outer bearing race 2 and an inner bearing race 3. Each bearing race 2 and 3 is provided at each side surface, only one of which is shown, with a recess 4 or 5. These recesses 4 and 5 serve to retain independent rings 6 and 7, which rings are made of a magnetic material. The rings 6 and 7 are permanent magnets of ferromagnetic material in this embodiment and are firmly connected with the ball bearing races 2 and 3, e.g., in FIG. 1 they are preferably inserted into ball bearing races 2 and 3 with a snug fit. These rings can have a configuration like that of the well-known retaining rings. The annular grooves 4 and 5 provided in the ball bearing races 2 and 3 may be designed with an undercut, as shown in FIG. 1. Magnetic rings 6 and 7 can then be given a bevelled edge that matches the undercut, so that the firm connection of the magnetic rings 6 and 7 with the ball bearing races 2 and 3 is additionally supported mechanically. The rings 6 and 7 can then be snapped into position. Magnetic rings 6 and 7 can also be connected to the machine components by means of a suitable adhesive. One of the magnetic rings 6 and 7 rotates and the other remains stationary, depending on whether the ring is attached to the rotating or stationary bearing race. Either race, or both races, may be rotating.

It is possible, of course, for both of the machine components in any of the embodiments disclosed to be rotating, as long as the components have relative motion with respect to each other. The magnetic rings 6 and 7 are disposed in a common radial plane and are dimensioned such that an annular gap 8 remains between them. The magnetic rings 6 and 7 must be fitted so tightly with respect to one another in the radial direction that a relatively small annular gap 8 remains between the magnetic rings 6 and 7. With such a narrow gap 8, variations in the gas or air pressure have practically no effect on the annular sealing plates as regards warping toward one side or the other and the like. The width of the gap 8 is preferably equal to the thickness of a plate 9 or 10. Contact of the magnetic rings 6 and 7 with each other must not occur. The magnetic rings 6 and 7 are covered on the inside and/or outside by annular plates 9 and 10. These annular plates may consist of magnetizable steel, or of a flexible synthetic material such as nylon having magnetizable materials such as ferrites dispersed in it, or of a magnetizable sinter material such as either a sintered metal, e.g., one known under the tradename "Almico," or sintered ferrites. They also may be permanent magnets. The annular plates 9 and 10 are advisably selected to be very thin so that they remain flexible and, thus, easily adhere to the side surfaces of the magnetic rings 6 and 7. Moreover, thin, flexible plates have extraordinarily strong adherence to the magnet.

Figure 2:
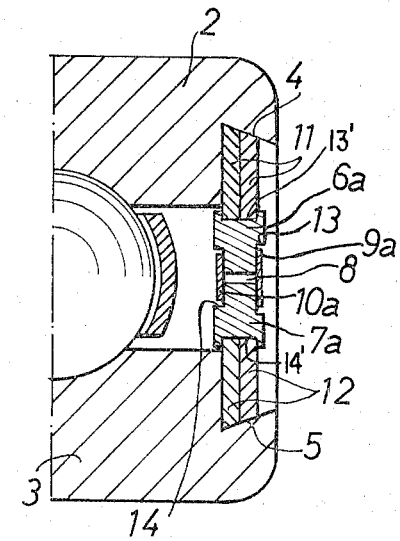
FIG. 2 is a cross-sectional view of another embodiment of a slide ring seal according to the present invention.

The embodiment shown in FIG. 2 is particularly advantageous for use with larger dimensioned roller bearings and the like. In order to realize magnetic rings which are not too large, the space between the ball bearing races 2 and 3, and magnetic rings 6a and 7a is bridged by appropriate intermediate rings 11 and 12, which can be of steel, a suitable synthetic, or the like. The sealing steel plates 9a and 10a, which are in magnetic contact with magnetic rings 6a and 7a, are disposed in the annular recesses 13 and 14 of the magnetic rings 6a and 7a, thus producing an approximate centering of the plates 9a and 10a. The intermediate rings 11 and 12, which are shown as made up of two segments, but may also be provided in lesser or larger numbers of segments, are inserted tightly into grooves 4 and 5 of the races 2 and 3. Likewise, the intermediate rings 11 and 12 are firmly and tightly connected with magnetic rings 6a and 7a by means of grooves 13' and 14' in the latter members.

Figure 3:
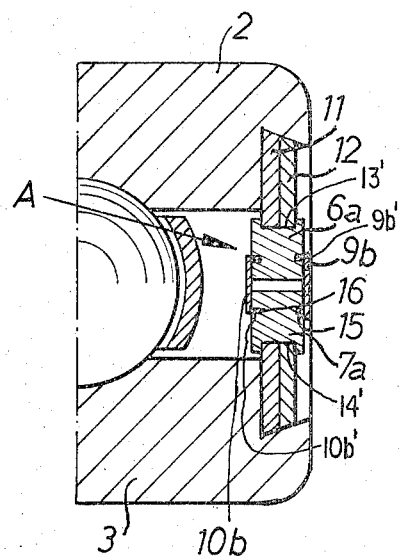
FIG. 3 is a cross-sectional view showing a variation of the embodiment of FIG. 2.

The embodiment of FIGS. 3 and 3a corresponds substantially to that of FIG. 2. The annular sealing plates 9b and 10b are constructed in a cup shape. They are provided with collars 9b' and 10b' around their edges, which collars may extend all the way around the periphery of the annular plates 9b and 10b or may be interrupted along the periphery. These collars 9b' and 10b' engage, as can be seen more clearly in FIG. 3a, into annular grooves 15 and 16, respectively. The grooves 15 and 16 are deeper than the height of the collar so that the annular sealing plates 9b and 10b can rest flush against the magnetic rings 6a and 7a.

Figure 4:
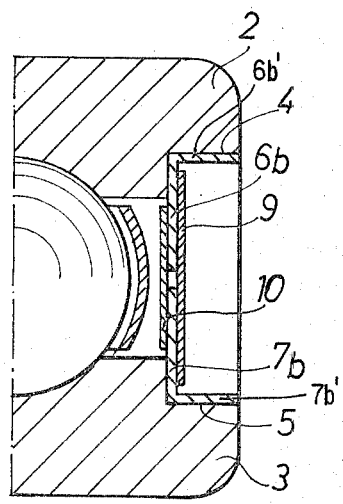
FIG. 4 is a cross-sectional view of a further embodiment of a slide ring seal according to the present invention.

In the example of FIG. 4, the magnetic rings 6b and 7b are constructed as annular rings, where the axially disposed arms 6b' and 7b' are fitted snugly into the recesses 4 and 5 of the bearing races 2 and 3. Annular plate 9 can also have a cup-shaped cross section, as shown in FIG. 4a, so that the cup-shaped annular disc rests against the magnetic rings 6b and 7b in the axial direction, and is approximately centered in the radial direction. The annular plate advantageously consists of a flexible material, e.g., a flexible synthetic, such as nylon, with powdered iron incorporated therein.

FIG. 5 shows a slide ring seal according to the invention for sealing a journal bearing. Appropriate structural elements 18 are fastened tightly onto shaft 17, so that elements 18 rotate together with shaft 17. The stationary bearing housing 19 is provided with bearing 20 in which the shaft 17 rotates. At each of the frontal faces of housing 19 there is provided a slide ring seal which substantially corresponds in its construction to the slide ring seal of FIG. 2. The intermediate plates 11 and 12 are permanently inserted into the housing 19 and the structural component 18, and produce a firm connection with rings 6a and 7a, between which there remains a narrow annular gap 8. This annular gap is magnetically sealed at one or both sides by the annular sealing plates 9a and 10a. Here, too, a gas-tight seal is realized for the journal bearing 20.

The magnetization of the magnetic rings can occur in several ways. For example, the outer magnetic ring 6 (FIG. 1) may be provided with a north pole on its one face and a south pole on its other face. Correspondingly, the magnetic ring 7 will have a south pole on the one side and a north pole on the other. Advantageously, the north and south poles will alternate in the radial direction on at least two concentric circles on the abutment surface. This prevents drifting of the sealing plates 9 and 10 at high rotational speeds of the bearing races. The annular sealing plates automatically center themselves and contact with the frontal face of any of the machine components or the magnetic rings is prevented.

Figure 6:
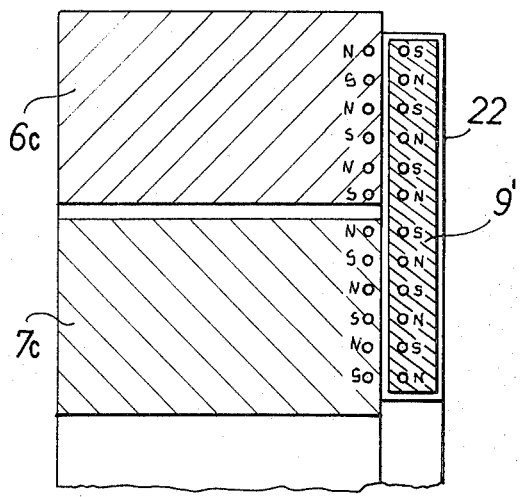
FIG. 6 is a cross-sectional view of another embodiment of a slide ring seal according to the present invention.
Figure 7:
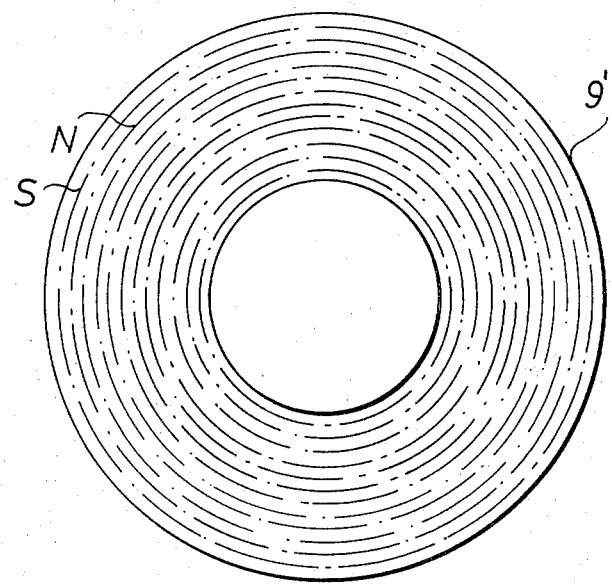
FIG. 7 is an elevational end view of the magnetized surface of a sealing plate of the embodiment of FIG. 6.

FIGS. 6 and 7 show an embodiment of a slide ring seal which uses a magnetic slide ring plate designated as 9', which is in contact with machine parts 6c and 7c. At least one of parts 6c and 7c is rotating. The plate 9' is relatively thin and flexible. It may be constructed in such a manner that powdered iron is embedded in sufficient amounts in a mass consisting preferably of a flexible synthetic, such as nylon; or a thin steel disc may be used. To increase the slidability of the plate 9', it may be encased by a wear-resistant layer 22. This wear-resistant layer 22 may be of any suitable material, e.g., nylon or polytetraflouroethylene.

The magnetization of plate 9' is carried out in a well-known manner so that the direction of magnetization is axial, and in this axial direction the surface contacting one of the parts 6c and 7c preferably exhibits a multiple alternation of north and south poles. In the illustrated example, there are provided five such alternations of the magnetic poles. The abutment surface on machine portion 7c is provided with the corresponding number of pole alternations. When the relatively rotating parts 6c and 7c are not magnetized, the corresponding counterpoles to the poles in plate 9' are formed in parts 6c and 7c. Advantageously, the surface of the rotating component will be aligned in the same manner as the annular magnetic plate 9', but in such a way that a north pole on the annular magnetic plate 9' is opposite a south pole on the rotating component 6c or 7c and vice versa. When the annular magnetic plate 9' tends to shift in the radial direction, for example, a north pole on the annular magnetic ring 9' approaches the north pole on the rotating component, which repels the plate 9' therefrom in the radial direction. The same thing happens with the south poles. Thus, when the annular magnetic plate 9' drifts out of its concentric position, there results a natural magnetic repulsion, and the annular magnetic plate is returned into its concentric position. Even very high centrifugal forces can not change this. The annular magnetic plate 9' remains in its centered position even under the influence of centrifugal forces. Thus, drifting of the annular magnetic plate 9' is effectively prevented. Moreover, it is also impossible for either the inner peripheral edge of 7c or the outer peripheral edge of 6c to come into contact with an axial portion of either the stationary component or the rotating component. In this manner, crimping or warping of the magnetic slide ring seal, and thus, its untightening, is prevented even under extreme conditions, without requiring additional holding devices or the like. These devices are expensive on the one hand and on the other hand unnecessarily widen the magnetic slide ring seal.

Parts 6c and 7c may also be magnetized. The contact surfaces of these components with plate 9' are then magnetized in the same manner, but always so that a south pole is opposite a north pole and vice versa.

As shown in FIG. 7, the north and south poles extend on concentric circles on the abutment surface of plate 9', the magnetization either being accomplished along these circles or interrupted between circular zones. It is also possible, however, to dispose the north and south poles only at certain points along the circular lines, and the poles may be provided in a more or less close succession along the circular zone. The number of pole alternations in the radial direction, or the number of poles along the circular zones, depends on the amount of magnetic force required for the seal. The axial magnetization of the magnetic ring need not penetrate the entire thickness of the magnetic rings, but only to a depth necessary to provide the desired magnetic force.

It will be understood that the above description of the present invention is susceptible to various modifications, changes and adaptations, and the same are intended to be comprehended within the meaning and range of equivalents of the appended claims.

We claim:

1. A slide ring seal for sealing an annular space between the races of ball bearings comprising, in combination:
   a. first and second ring means each formed from a permanently magnetized material, each of said ring means being attached to a respective one of said races in a sealing manner by means including a groove means formed in each of the races, each groove means receiving one of the ring means such that relative rotation between said ring means and their respective races is prevented, said ring means being arranged in a common radial plane and having an annular gap between them; and
   b. at least one flexible, thin annular plate means, said annular plate means being formed from a magnetic material, said ring means and said plate means having abutment surfaces which are magnetically held such that said plate means forms a slidable contact with said ring means so that said plate means covers the annular gap between said ring means.

2. A slide ring seal as defined in claim 1, wherein each of said ring means is a permanent magnet having at least one pair of north and south poles alternating in the radial direction along its abutment surface.

3. A slide ring seal as defined in claim 2, wherein said at least one annular plate means is constructed from a magnetizable steel.

4. A slide ring seal as defined in claim 2, wherein said at least one annular plate means is constructed from a flexible synthetic material having a magnetizable material dispersed through it.

5. A slide ring seal as defined in claim 1, wherein said at least one annular plate means is a permanent magnet having at least one pair of alternating north and south poles spaced along the abutment surface of said annular plate means.

6. A slide ring seal as defined in claim 5, wherein the alternating north and south poles are disposed in concentric circles on the abutment surface of said annular plate means.

7. A slide ring seal as defined in claim 6, wherein said ring means and said annular plate means each include a plurality of magnetic poles alternating from north poles to south poles along the abutment surface of the respective means, the spacing of the alternating poles being interrupted at certain points on the abutment surface of the respective means.

8. A slide ring seal as defined in claim 1, wherein the width of the annular gap between said ring means is substantially equal to the thickness of said at least one annular plate means.

9. A slide ring seal as defined in claim 1 wherein said ring means each have at least one pair of opposed radial surfaces and there are two annular plate means, each annular plate means held to a respective one of the opposing surfaces.

10. A slide ring seal as defined in claim 1, wherein each groove means includes an undercut portion which engages said ring means for directly fastening said ring means with said races.

11. A slide ring seal as defined in claim 1, further comprising intermediate means to attach said ring means to their respective races.

12. A slide ring seal as defined in claim 1, wherein said plate means is not permanently magnetized.

13. A slide ring seal as defined in claim 1, wherein said ring means forms a recess in which said plate means is received to form said slidable contact.

14. A slide ring seal for sealing an annular space between a stationary machine component and a rotating machine component comprising, in combination:
   a. first and second ring means each formed from a magnetic material, said first ring means being attached to the stationary machine component and said second ring means being attached to the rotating machine component, said ring means being arranged in a common radial plane and having an annular gap between them;
   b. at least one flexible, thin annular plate means, said annular plate means being formed from a magnetic material and being magnetically held against said ring means so that it covers the annular gap between the ring means; and
   c. means including at least one intermediate ring for each ring means to attach said ring means to their respective machine components.

15. A slide ring seal as defined in claim 14, wherein said at least one intermediate ring is two radially abutting rings.

16. A slide ring seal as defined in claim 14, wherein said intermediate rings are attached to their respective machine components by undercut, annular recesses in the machine components.

17. A slide ring seal for sealing an annular space between a stationary machine component and a rotating machine component comprising, in combination:
   a. first and second ring means each formed from a magnetic material, said first ring means being attached to the stationary machine component and said second ring means being attached to the rotating machine component, said ring means being arranged in a common radial plane and having an annular gap between them; and
   b. at least one flexible, thin annular plate means, said annular plate means being formed from a magnetic material and being magnetically held against said ring means so that it covers the annular gap between the ring means, said annular plate means having axially extending collars and said ring means having annular grooves that receive said collars.

18. A slide ring seal for sealing an annular space between a stationary machine component and a rotating machine component comprising, in combination:
   a. first and second ring means each formed from a magnetic material, said first ring means being attached to the stationary machine component and said second ring means being attached to the rotating machine component, said ring means being arranged in a common radial plane and having an annular gap between them; and
   b. at least one flexible, thin annular plate means, said annular plate means being formed from a magnetic material and being magnetically held against said ring means so that it covers the annular gap between the ring means, said ring means having annular recesses into which said annular plate means is disposed.

19. A slide ring seal for sealing an annular space between a stationary machine component and a rotating machine component comprising, in combination:

a. first and second ring means each formed from a magnetic material, said first ring means being attached to the stationary machine component and said second ring means being attached to the rotating machine component, said ring means being arranged in a common radial plane and having an annular gap between them; and b. at least one flexible, thin annular plate means, said annular plate means being formed from a magnetic material and being magnetically held against said ring means so that it covers the annular gap between the ring means, said ring means are annular rings having axially extending collars disposed in annular recesses in the machine components.

20. A slide ring seal as defined in claim 19, wherein said annular plate means has axially extending collars disposed in said ring means.

* * * * *